(12) United States Patent
Chopra et al.

(10) Patent No.: US 6,510,509 B1
(45) Date of Patent: Jan. 21, 2003

(54) METHOD AND APPARATUS FOR HIGH-SPEED NETWORK RULE PROCESSING

(75) Inventors: Vikram Chopra, Pune (IN); Ajay Desai, Pune (IN); Raghunath Iyer, Los Altos, CA (US); Sundar Iyer, Palo Altos, CA (US); Moti Jiandani, Fremont, CA (US); Ajit Shelat, Pune (IN); Navneet Yadav, Pune (IN)

(73) Assignee: PMC-Sierra US, Inc., Santa Clara, CA (US)

( * ) Notice: Subject to any disclaimer, the term of this patent is extended or adjusted under 35 U.S.C. 154(b) by 0 days.

(21) Appl. No.: 09/280,235

(22) Filed: Mar. 29, 1999

(51) Int. Cl.[7] .............................................. G06F 15/00
(52) U.S. Cl. ........................... 712/13; 709/236; 709/238
(58) Field of Search ............................ 712/13; 719/236, 719/238

(56) References Cited

U.S. PATENT DOCUMENTS 5,805,915 A * 9/1998 Wilkinson et al.
5,828,894 A * 10/1998 Wilkinson et al.
5,930,254 A * 7/1999 Liron et al.
5,951,651 A * 9/1999 Lakshman et al.

* cited by examiner

Primary Examiner—John A. Follansbee
(74) Attorney, Agent, or Firm—Dag Johansen; Stattler, Johansen & Adeli LLP

(57) ABSTRACT

A high-speed rule processing apparatus is disclosed that may be used to implement a wide variety of rule processing tasks such as network address translation, firewall protection, quality of service, IP routing, and/or load balancing. The high-speed rule processor uses an array of compare engines that operate in parallel. Each compare engine includes memory for storing instructions and operands, an arithmetic-logic for performing comparisons, and control circuitry for interpreting the instructions and operands. The results from the array of compare engines is prioritized using a priority encoding system.

8 Claims, 15 Drawing Sheets

Coded firewall rule control

| Firewall Instruction code 4-bits | ALU #1 control bits 5-bits | ALU #2 control bits 4-bits | ALU #3 control bits 5-bits | ALU #4 control bits 5-bits | ALU #5 control bits 1-bit | ALU #6 control bits 1-bit | Common control bits 3-bits |
|---|---|---|---|---|---|---|---|

Fig. 7b

| ALU #1 Opcode 3-bits | ALU #1 Mask enable 1-bit | ALU #1 Packet Routing 1-bit |
|---|---|---|

=

| ALU #1 control bits 5-bits |
|---|

Fig. 7c

| ALU #2 Opcode 2-bits | ALU #2 Mask enable 1-bit | ALU #2 Packet Routing 1-bit |
|---|---|---|

=

| ALU #2 control bits 4-bits |
|---|

Fig. 7d

| ALU #3 Opcode 2-bits | ALU #3 Mask enable 1-bit | ALU #3 Packet Routing 2-bits |

=

| ALU #3 control bits 5-bits |

Fig. 7e

| ALU #4 Opcode 2-bits | ALU #4 Packet Routing 2-bits | ALU #4 Merge bit 1-bit |

=

| ALU #4 control bits 5-bits |

Fig. 7f

| ALU #5 Enable bit 1-bit |

=

| ALU #5 control bits 1-bit |

Fig. 7g

ALU #6 control bits
1-bit

=

ALU #6 Enable bit
1-bit

Fig. 7h

Common control bits
3-bits

=

| Composite Rule bit 1-bit | Increment/Decrement Statistics Counter or Threshold register bit 1-bit | Threshold Register or Statistics Counter used bit 1-bit |

US 6,510,509 B1

METHOD AND APPARATUS FOR HIGH-SPEED NETWORK RULE PROCESSING

FIELD OF THE INVENTION

The present invention relates to the field of computer networking. In particular the present invention discloses methods and apparatus for network gateway devices that implement firewall, IP routing, quality of service, load balancing, and/or network address translation rules.

BACKGROUND OF THE INVENTION

The Internet is a worldwide interconnection of computer networks that share a common set of well-defined data communication protocols. Specifically, most computer networks that are coupled to the global Internet communicate using the Transport Control Protocol (TCP) and Internet Protocol (IP) commonly known as TCP/IP.

There is no central controlling authority for the global Internet. The individual entities coupled to the global Internet are responsible for their own interaction with the Internet. To protect private networks, such as Local Area Networks (LANs), most private networks use an Internet Gateway that regulates communication with the global Internet. An Internet gateway handles all communication between computers on a local area network and computers out on the global Internet. The Internet gateway may perform many different functions such as network address translation, firewall protection, IP routing, quality of service, and/or load balancing.

Network address translation is used to translate addresses from a first address domain into addresses within a second address domain. A typical device with network address translation has two different network ports. The first network port is coupled to an internal network with an "internal" network address and the second network port is coupled to the global Internet with a legally allocated Internet protocol address. The two-port network address translation device thus handles all Internet communication between internal computer nodes having internal network addresses and an Internet computer system having fully qualified Internet Protocol addresses.

Firewall protection attempts to prevent unauthorized accesses. Firewall protections are implemented using a set of packet filtering rules. Each packet-filtering rule specifies a particular packet filtering policy. For example, all packets incoming from the Internet addressed to vulnerable server ports may be discarded in order to protect the internal servers on the local area network. The firewall device examines each packet and applies any applicable firewall packet-filtering rule.

Routing is the process of locating the path to be taken by a packet in the Internet. Routing rules specify a next hop address and the port number associated with the next hop to be taken by a packet. For example, all packets which are destined to a particular IP network can be sent to a LAN port (a port attached to the local area network) and all other packets may be sent to WAN port (a port attached to the wide area network)

Quality of Service is the common term used to indicate different levels of service for different customers or different protocol streams. For example, packets from a high-paying commercial customer may receive a higher grade of service than packets from a low-paying customer. Similarly, packets from a real-time video or audio streaming application may receive more prompt service than packets from a large file transfer operation.

Load balancing is the task of selecting a least utilized resource such that a "load" is balanced among all the available resources. For example, a popular web page will be placed on a large number of similarly configured server systems. When a web client requests a popular web page, a load-balancing device will select the server system that is currently experiencing a light load.

These common Internet gateway tasks are often performed by general-purpose computer systems running firewall software for small LANs coupled to the Internet. However, an Internet gateway for a very large LAN or an internet service provider (ISP) with a high bandwidth communication channel will need to process thousands of packets each second using thousands of rules that implement the gateway features. In such environments, simple general-purpose computer systems will be inadequate. It would be desirable to have an Internet gateway device that can perform packet processing at wire-speed.

SUMMARY OF THE INVENTION

The present invention introduces a high-speed rule processing apparatus that may be used to implement a wide variety of rule processing tasks such as network address translation, firewall protection, quality of service, IP routing, and/or load balancing. The high-speed rule processor uses an array of compare engines that operate in parallel. Each compare engine includes memory for storing instructions and operands, an arithmetic-logic for performing comparisons, and control circuitry for interpreting the instructions and operands. The results from the array of compare engines is prioritized using a priority encoding system.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 7a illustrates one embodiment of an encoded firewall rule that controls the operation of a nanocomputer.

FIG. 7b illustrates the first ALU control portion of the encoded firewall rule of FIG. 7a.

FIG. 7c illustrates the second ALU control portion of the encoded firewall rule of FIG. 7a.

FIG. 7d illustrates the third ALU control portion of the encoded firewall rule of FIG. 7a.

FIG. 7e illustrates the fourth ALU control portion of the encoded firewall rule of FIG. 7a.

FIG. 7f illustrates the fifth ALU control portion of the encoded firewall rule of FIG. 7a.

FIG. 7g illustrates the sixth ALU control portion of the encoded firewall rule of FIG. 7a.

FIG. 7h illustrates the common control bits portion of the encoded firewall rule of FIG. 7a.

DETAILED DESCRIPTION OF THE PREFERRED EMBODIMENT

A method and apparatus for performing high-speed packet processing is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an embodiment within an Internet gateway that couples a local area network to the global Internet. However, the same packet-processing engine can easily be used in other applications such as general-purpose routers and the accounting systems of Internet service providers (ISP) that monitor and control the network usage of various ISP customers. Furthermore, the rule processing teachings of the present invention have been disclosed with reference to network address translation, firewall protection, quality of service, IP routing, and/or load balancing tasks. However, other types of packet processing tasks may also be implemented.

An Internet Gateway Application

Figure 1:
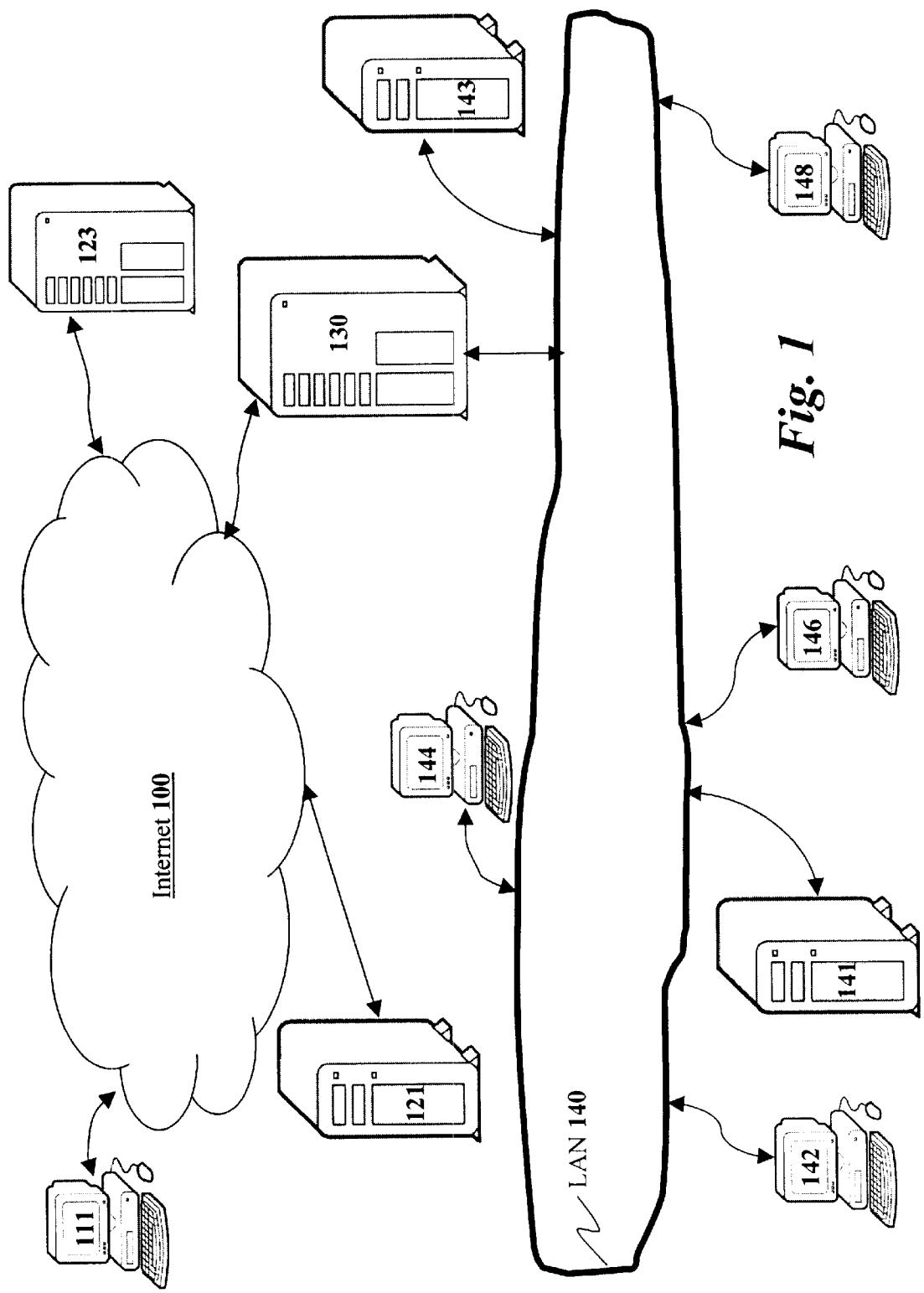
FIG. 1 illustrates a typical small local area network (LAN) coupled to the Internet through an Internet gateway device that performs a variety of packet processing tasks for data packets that travel between a local network and the global Internet.

FIG. 1 illustrates one possible network application of high-speed packet processing. Specifically, FIG. 1 illustrates a local area network coupled to the global Internet with an Internet gateway device that performs packet processing.

Referring to FIG. 1, a local area network (LAN) 140 is illustrated with a set of computer workstations 142, 144, 146, and 148 coupled thereto. The local area network (LAN) 140 environment also includes a couple of servers 141 and 143. If the servers 141 and 143 are only used for internal purposes then the internal servers 141 and 143 should only be accessible by internal clients such as computer workstations 142, 144, 146, and 148.

All communication between computer systems on the internal local area network 140 and the global Internet 100 passes through an Internet gateway 130. The Internet gateway 130 may provide a number of packet processing features. For example, the Internet gateway 130 may perform network address translation, firewall protection, quality of service, IP routing, and/or load balancing tasks.

Network Address Translation

Network address translation may be used to translate internal network addresses on the internal LAN 140 into fully qualified Internet addresses for use on the Internet 100. For example, when an internal workstation 142, 144, 146, or 148 wishes to initiate communication with a server (121 or 123) on the Internet, the Internet gateway 130 intercepts the communication and replaces the internal workstation's source address with a fully-qualified Internet address held by the Internet gateway 130. When the Internet server responds, the Internet gateway 130 will translate the fully-qualified Internet address back into the workstation's internal address and pass the packet onto the internal LAN 140.

Network address translation is normally performed on a connection basis. Specifically, when a client system opens an allowed connection with a server system, a network address translation device memorizes information about that connection. The memorized information may include a client IP address, a client TCP port, a server IP address, and a server TCP port. When a packet is received, the network address translation device searches its list of known connections to determine if and how the address should be translated.

Firewall Protection

Firewall protection provides network security. To prevent unauthorized access, the Internet gateway 130 processes packets with a set of firewall security rules that screen out packets related to unauthorized actions. For example, if the servers 141 and 143 are only to be used for internal purposes then the Internet gateway 130 should screen out all packets originating from the global Internet 100 and destined for the internal servers 141 and 143.

Firewall policies are typically implemented using a list of firewall rules. Each rule specifies a set of conditions to be matched and an associated action. If the conditions in a rule are met then the associated rule action is performed. For most firewall rules, the action specifies if the packet should be dropped or forwarded.

The set of conditions, in each rule varies significantly. Some rules only examine a few packet fields and other rules examine a number of different packet fields. Some rules are only activated upon exact matches and other rules require more complex comparisons such as less-than, greater-than, determining if a values is in a set defined by a particular value and mask, etc.

Routing

Routing is used to locate the path to be taken by a packet on a computer network such as the Internet. For example, an Internet Gateway 130 will need to look into the destination address of the packet and make a decision on the next hop address of the packet.

Typically routing is done by a lookup into a large routing table that contains a number of routing rules. Each of these routine rules specify a Destination IP address and a Destination Mask associated with the rule. The Router will select the longest matching route that matched the packet.

Quality of Service

Quality of Service is used to provide different levels of service for different customers or different protocol streams. For example, the Internet gateway 130 should provide faster service to packets from a user running an Internet telephony application than to a server performing a file transfer operation. Current qualities of service implementations are not capable of providing quality of service operations at wire-speed.

One standard quality of service task is the servicing of a plurality of a packet queues with the well-known "leaky bucket" servicing algorithm. In a typical implementation of the leaky bucket servicing algorithm, a network device must determine which queue of a plurality of queues should be serviced next. This determination is made by selecting the queue having the smallest "next time to send" (NTTS) value. The serviced queue's next-time-to-send value is then updated. Many algorithms are available for updating the next-time-to-send values.

Load Balancing

Load balancing is the task of selecting a least utilized resource such that a "load" is balanced among all the available resources. To perform load balancing, a set of load values is maintain for each available resource. When a load balanced resource is required, the resource having the minimum load value is selected. The load value for the selected resource is then updated.

An Integrated Gateway

To perform the network address translation, firewall protection, quality of service, and/or load balancing tasks, the gateway 130 of FIG. 1 must examine a number of different packet aspects. In an Internet application, the most interesting packet aspects to examine are in the Transport Control Protocol (TCP) packet header (or a UDP packet header) and the Internet Protocol (IP) packet header. In normal Internet usage, TCP packets are enclosed within IP packets.

Figure 2A:
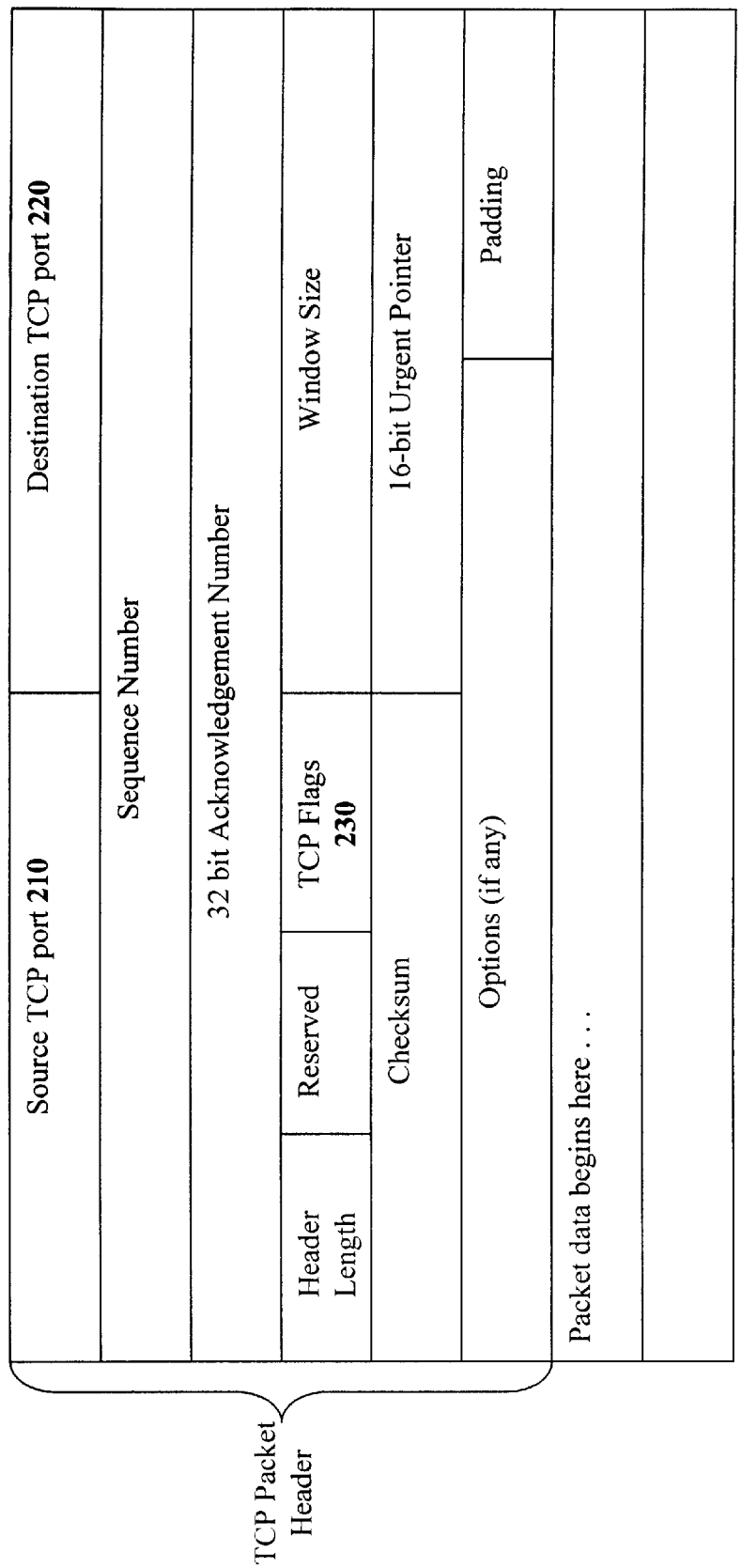
FIG. 2a illustrates the format of a packet from the Transport Control Protocol layer.

FIG. 2a illustrates the format of a Transport Control Protocol (TCP) packet. The objective of the Transport Control Protocol layer is to ensure a reliable connection between two computer nodes. Of particular interest to packet filtering applications are the source TCP port 210 and the destination TCP port 220. In some applications, a packet-filtering device may examine the flags 230 in the TCP packet header.

Figure 2B:
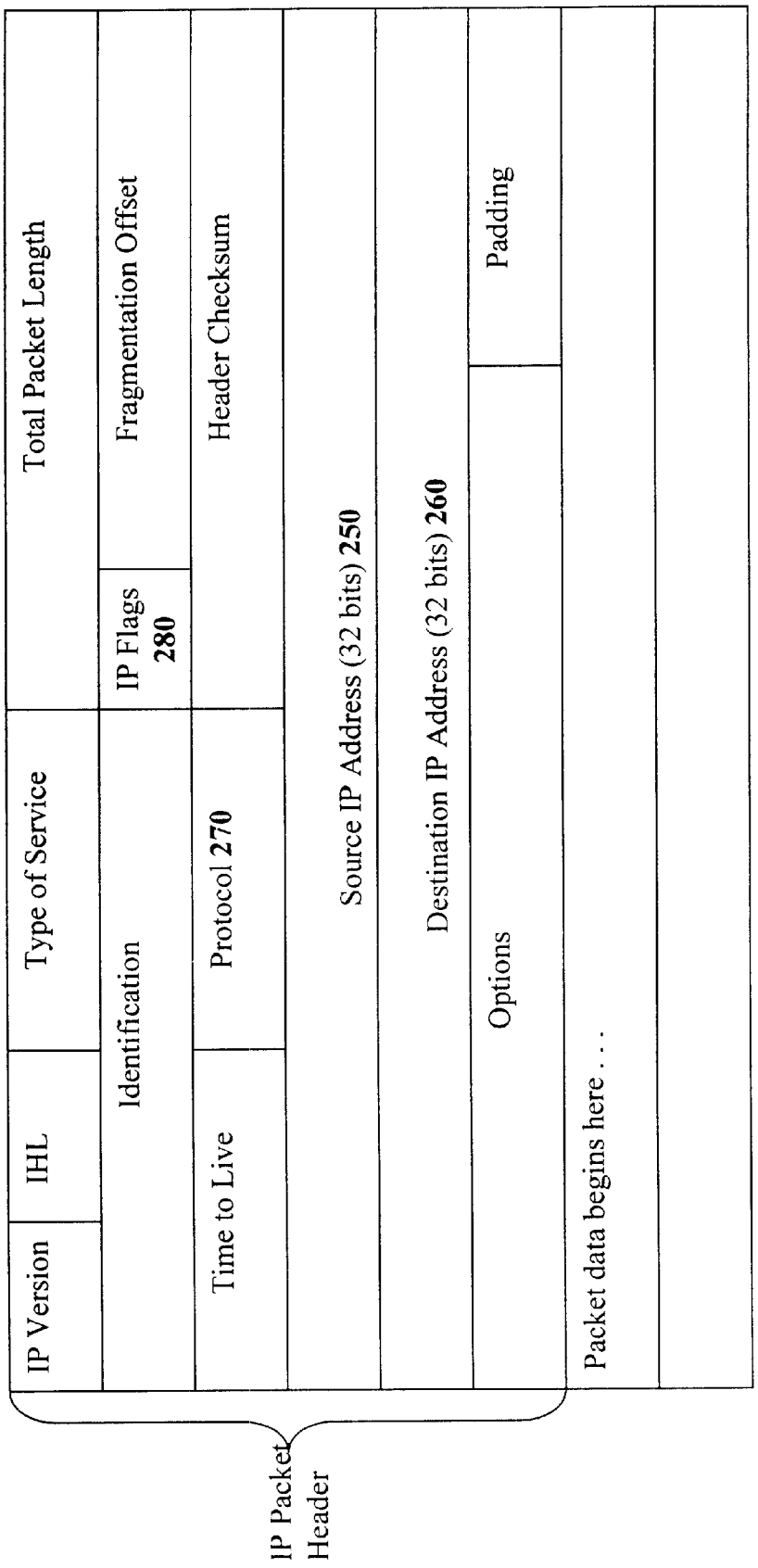
FIG. 2b illustrates the format of a packet from the Internet Protocol layer.

The TCP packet is typically enclosed within an Internet Protocol packet. FIG. 2b illustrates an Internet Protocol (IP) packet header. The objective of the Internet Protocol layer is to ensure that an Internet packet is properly routed from a source node having a source Internet Protocol (IP) address 250 to a destination node having a destination Internet Protocol (IP) address 260. Packet filtering devices typically process packets by examining the source Internet Protocol (IP) address 250 and the destination Internet Protocol (IP) address 260. Another important aspect that may be examined is the Protocol 270 field in the IP packet header. The Protocol 270 field specifies the type of protocol being used to transport the packet. If a TCP packet is enclosed, then the Protocol will specify the particular type of TCP protocol packet enclosed.

In an ideal system, a single network border device such as the Internet gateway 130 would be able to extract the desired fields from the TCP and IP packet headers and perform the network address translation, firewall protection, quality of service, IP routing, and/or load balancing tasks. Furthermore, to minimize packet latency, the network border device should perform all of these tasks at "wire speed", meaning that the packets are processed and dispatched just as fast as the packets are received. However, in an Internet gateway system with thousands of rules to process and a number of different services to provide (firewall, network address translation, quality of service, load balancing, etc.) a general purpose processor will not be able to process all of the incoming packets at wire-speed.

Content Addressable Memory Systems

One method of performing high speed searches for a network border device is to use pre-programmed content addressable memories (CAMs). For example, a content addressable memory may be programmed with a set of firewall rule conditions. Then, incoming packets are exposed to the content addressable memories such that the content addressable memories associated with matching firewall rules are activated.

Although content-addressable memory based packet filtering systems work for some applications, such content-addressable memory based packet filtering systems have severe limitations. Specifically, content-addressable memory based packet filtering systems do not support many different types of comparison conditions are difficult and time-consuming to program, and do not scale well.

The basic operation of a content-addressable memory is to activate a match signal and determine the location of the highest priority match, when a match is detected. Thus, content-addressable memories are very well suited for applications that must detect exact matches between data items. However, content-addressable memories are not very good for performing other comparison operations such as less than, less than or equal to, greater than, greater than or equal to, etc.

Ternary Content Addressable Memories (TCAMs) are able to perform range compares only for certain specific values. In addition, these ranges must start at specific locations. Essentially TCAMs accept a value and a mask and as such, only these ranges can be represented. If the range is cannot be expressed in the above format, more than one TCAM rule will be required to split the range into parts that can be represented as a value and a mask.

To use a content-addressable memory system for a packet filtering application, the content-addressable memory must be loaded with a set of match patterns. Each time a new rule is added, the content-addressable memory system must be reprogrammed to include the information for the new rule. Thus, content-addressable memory systems are not ideal for systems that have dynamic firewall policies.

In a firewall packet filtering system, many different packet fields potentially need to be examined. However, most rules will examine only a few of the packet fields. Even though most packet-filtering rules only need to examine a few fields, in a content-addressable memory based packet filtering system, content-addressable memory is assigned for all of the fields. Thus, content-addressable memory based packet-filtering systems are memory inefficient.

CAMs can not perform a chain of successive operations (searches); i.e. operations based on the search result of a previous operation. CAMs do not prioritize the search results. Furthermore, CAMs do not inspect arbitrary parts of a packet and search for data. External support is required to so all of the above operations in a CAM.

The present invention introduces a specialized processing unit for packet processing. The specialized processing unit performs wire-speed packet filtering for with a set of packet-filtering rules that may be changed dynamically. The present invention also assists in NAT, load balancing, and QoS scheduling.

The Packet Inspector Architecture

To process network packets at wire-speed, the present invention introduces a massive parallel processor (MPP) architecture on a single integrated circuit (IC) device. The single IC massive parallel processor (MPP) architecture device is known as the Packet Inspector Engine (PIE). The Packet Inspector Engine includes an internal compare block known as an Array of Cells (AoC) that is used to perform parallel comparisons. Although the Packet Inspector Engine of the present invention is disclosed with reference to a TCP/IP based packet filtering application, it may used in many other applications that require large searches to be performed very quickly.

Figure 3:
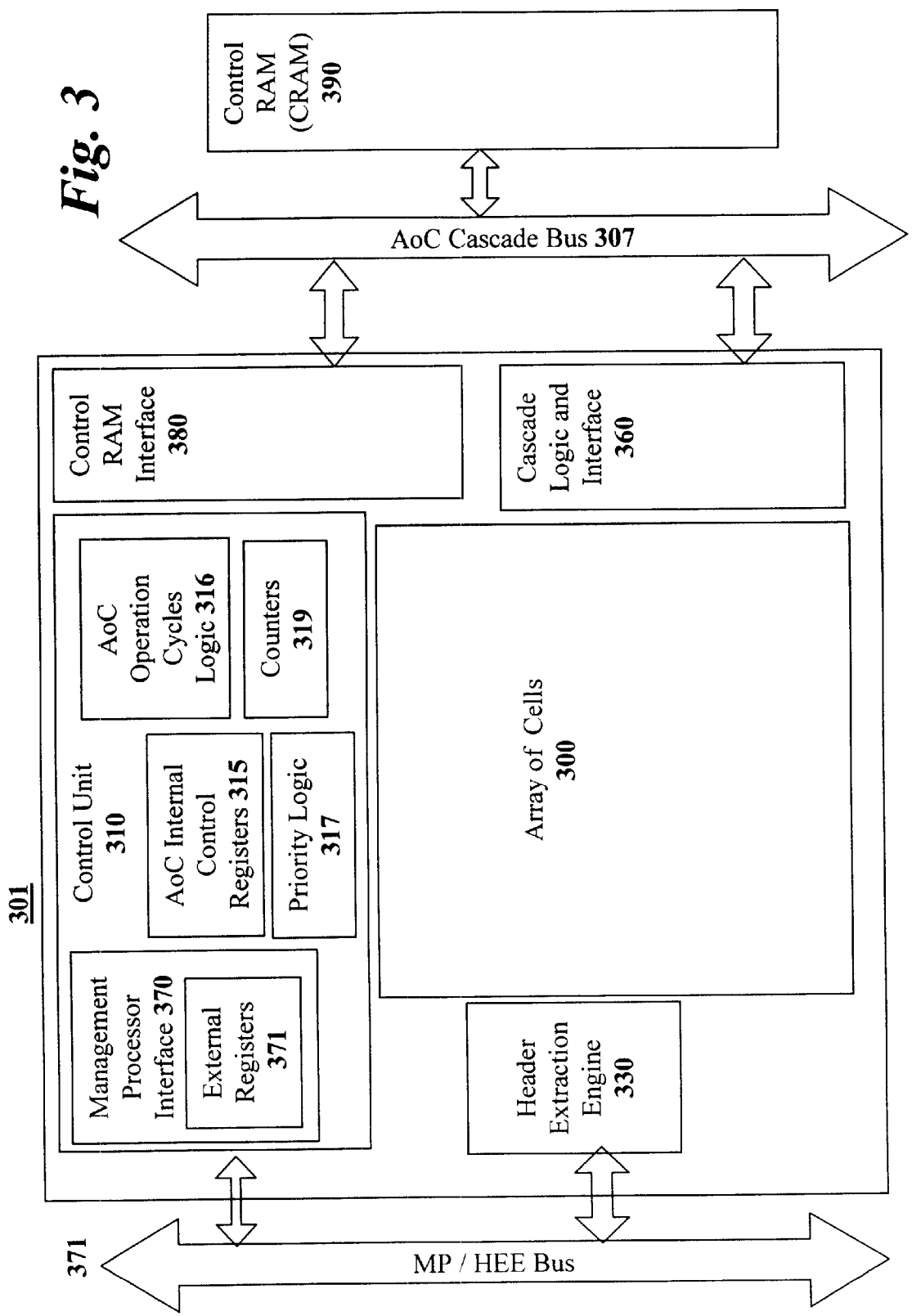
FIG. 3 illustrates the overall block diagram and the general architecture of the Packet Inspector engine (PIE).

FIG. 3 illustrates an architectural block diagram of the Packet Inspector Engine 301. As illustrated in FIG. 3, the main feature of the Packet Inspector Engine 301 is the massive parallel array of Cells 300. A control unit 310 that includes several internal control registers 315 controls the Array of Cells 300. Each cell in the array contains a threshold register and a statistics counter that may be used to monitor the operation. When the units in Array of Cells 300 execute an operation cycle and generate results, a priority logic unit 317 may be used to select a result having the highest priority. The Packet Inspector Engine can also prioritize the searches and return all the matches upon request.

The Packet Inspector Engine 301 further includes several interface units for interfacing with external elements. A management processor interface (MPI) 370 couples the Packet Inspector Engine 301 through a processor bus 371 to a general-purpose processor or control circuit that controls the operation of the Packet Inspector Engine 301. The management processor interface includes a set of externally visible control registers 371. A control RAM interface 380 couples the Packet Inspector Engine 301 to a control RAM (CRAM) 390. The control RAM (CRAM) 390 stores control information used to control the Array of Cells engine 300. Finally, a cascade logic and interface unit 360 couples the Packet Inspector Engine 301 to other Packet Inspector engines (not shown) in cascade arrangement such that multiple Packet Inspector Engines coupled to an AoC Cascade bus 307 can work in parallel.

A header extraction engine (HEE) 330 extracts packet header information and packet data information from packets delivered to the Packet Inspector Engine 301 such that these may be delivered to the array of Cells 300. In one embodiment, the HEE 330 is designed to extract certain specified fields from TCP/IP headers and UTDP/IP packet headers. For all other types of packet headers, any outside entity providing packet information may present the proper extracted fields to the HEE 330.

The Array of Cells Architecture

Figure 4A:
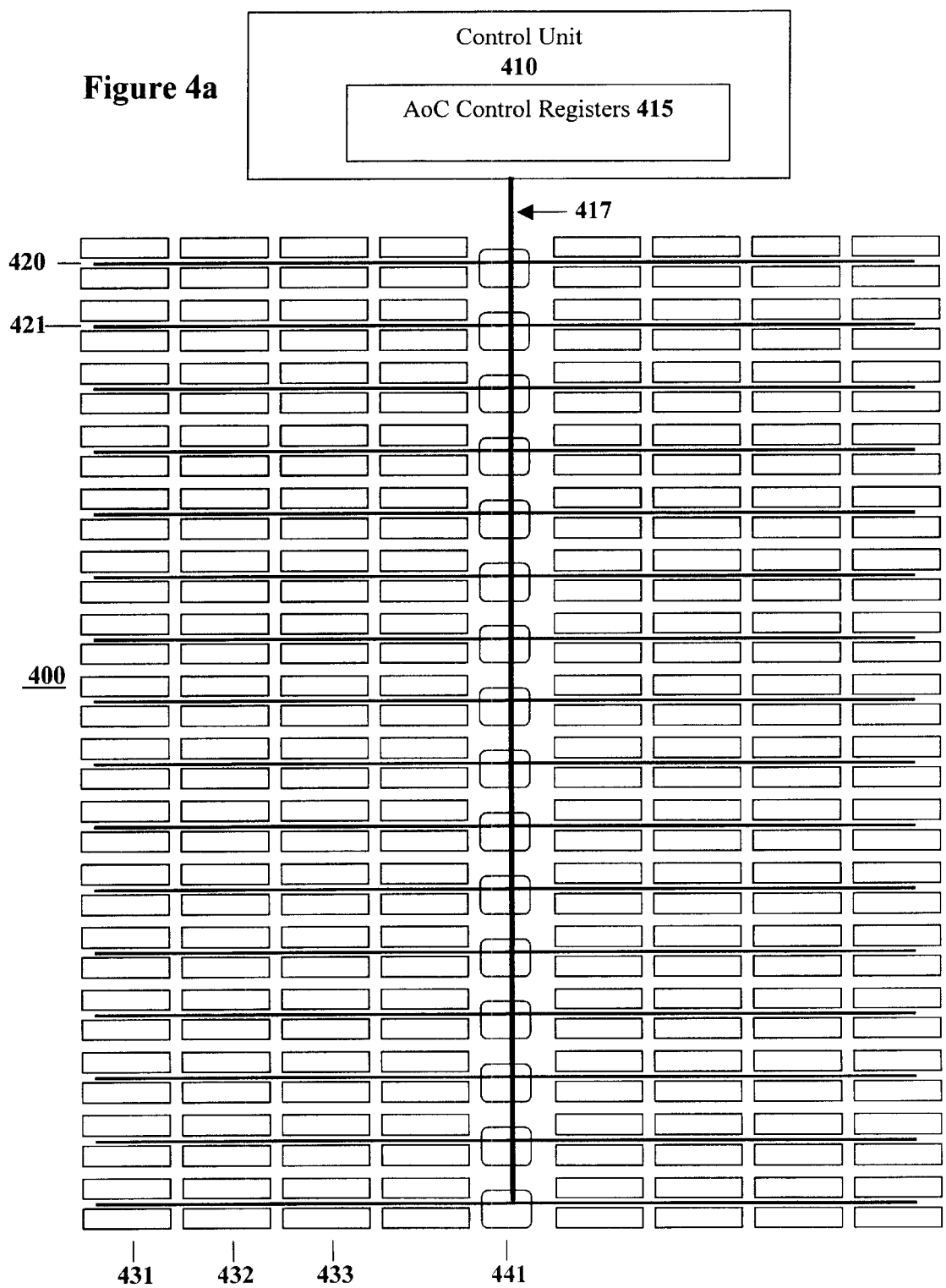
FIG. 4a illustrates one possible array arrangement of individual nanocomputers (Array of Cell Blocks).

The main feature of the Packet Inspector Engine 301 in FIG. 3 is the array of Cells 300. FIG. 4a illustrates one possible embodiment of the Array of Cells 400. In the embodiment of FIG. 4a, the control unit 410 controls the Array of Cells (AoC) engine 400. The control unit 410 includes several control registers 415. The control unit 410 controls a large array of nanocomputer units (431, 432, 433, etc.) through a main packet distribution bus 417.

The main packet distribution bus 417 is coupled to a set of "rib busses" (420, 421, etc.) that couple the individual nanocomputer units (431, 432, 433, etc.). Each rib bus (420, 421, etc.) is controlled by a rib control unit such as rib control unit 441. The rib control unit on each rib bus helps control the nanocomputer units on that rib bus. In the embodiment of FIG. 4a, there are sixteen (16) rib buses coupled to the main packet distribution bus 417 and sixteen (16) nanocomputer units coupled to each rib bus for a total of two hundred and fifty-six (256) nanocomputers in the Array of Cells (AoC) 400 structure.

Each nanocomputer unit (431, 432, 433, etc.) contains command and data information for processing a number of different rules. In one embodiment, each nanocomputer unit (431, 432, 433, etc.) contains information for thirty-two (32) different rules. Each of the command and data information units (rules) within each nanocomputer is known as a "cell". (Hence the name Array of Cells.)

In the embodiment of FIG. 4a, the Array of Cells (AoC) with sixteen nanocomputers on each of the sixteen rib buses with thirty-two rules in each nanocomputer can process eight thousand one hundred and ninety-two rules (16*16*32=8192 rules). When all the nanocomputers are being used for a single set of rules, all 8192 rules can be processed in a thirty-two cycle period (one cycle for each cell within each nanocomputer).

Cell Hierarchy

Figure 4B:
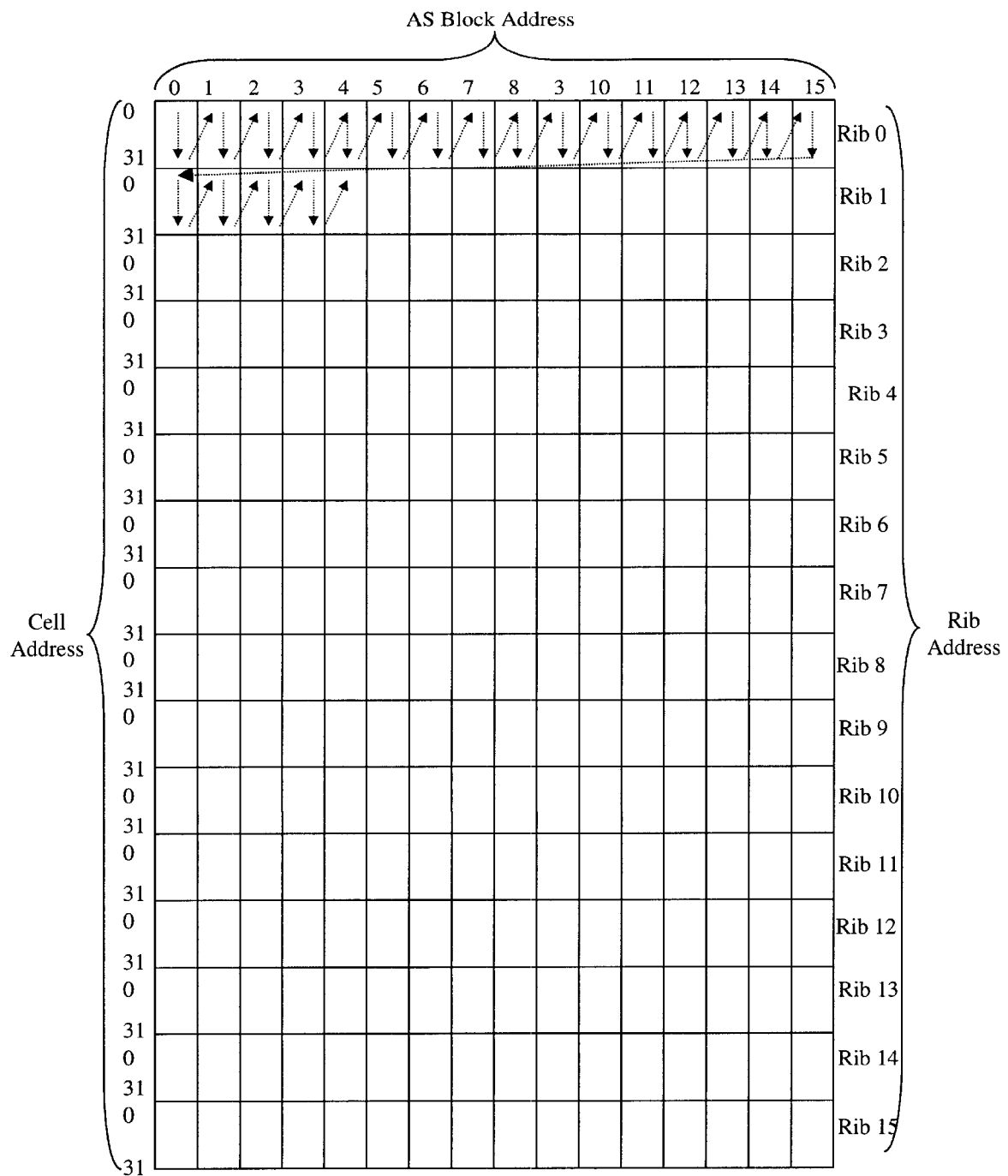
FIG. 4b illustrates a conceptual addressing diagram for addressing the individual cells (rules) in the array of cells.

FIG. 4b illustrates a conceptual diagram for the matrix of rules stored in the array of cells. In the conceptual diagram of FIG. 4b, each individual rule can be addressed by a four bit rib address (0 to 15), a four bit nanocomputer address (0 to 15), and a five bit cell address (0 to 32). A concatenated form of the rule address would take appears as:

Rule address=[4-bit rib address][four-bit nanocomputer address][five-bit cell address]

In one embodiment, this cell addressing system is used to provide an inherent priority system. The packet inspector engine uses this priority system to determine a highest priority result among a set of results. In FIG. 4b, a set of dashed arrows indicates the decreasing rule priority in one embodiment. Specifically, in the priority system, the rib position is more important than the nanocomputer position and the nanocomputer position is more important than the cell position. Thus, the rule addressed by rib 0, nanocomputer position 0, and cell position 0 has the highest priority. Similarly, the rule addressed by rib 15, nanocomputer position 15, and cell position 31 has the lowest priority.

In a preferred embodiment, the priority system is programmable such that different priority arrangements may be used. For example, to best distribute a search among all the available nanocomputers, the first row of cells in all the nanocomputers are programmed before the proceeding to the second row cells in all the nanocomputers and so on. In such an arrangement, the highest priority rule is in the first cell of the first nanocomputer of the first rib, the next highest priority rule is in the first cell of the second nanocomputer of the first rib, and so on until all rib blocks are exhausted. This process is repeated for all the remaining cells until the last cell of the last nanocomputer of the last rib.

General Operation

Figure 5:
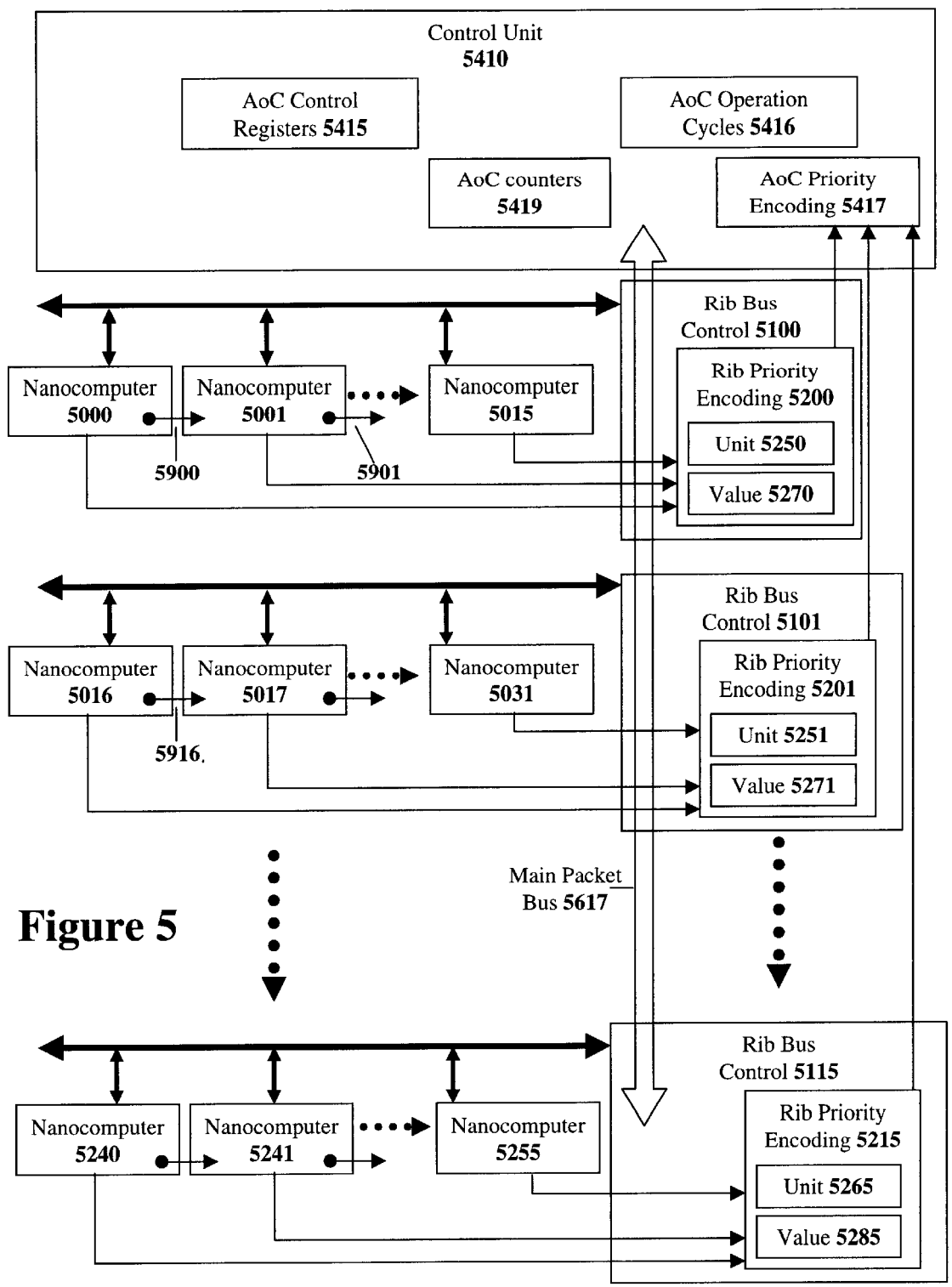
FIG. 5 illustrates a block diagram of one possible embodiment of an array of nanocomputers.

Referring back to FIG. 4a, the Array of Cells 400 operates in a hierarchical manner. The control unit 410 exercises overall control of the Array of Cells 400 by downloading rule information into the individual cells within each nanocomputer through the main packet distribution bus 417. Each rib control unit on the main packet distribution bus 417 receives downloaded information and passes that information to the appropriate nanocomputers located on the rib control unit's associated rib bus. FIG. 5 presents a conceptual block diagram that provides more detail. Each nanocomputer that receives downloaded information stores that information into the appropriate rule entries in the nanocomputer's memory.

The Array of Cells processes a data packet by sending the packet down the main packet distribution bus 5617 along with command information that describes the type of operation that should be performed and a description of the nanocomputer cells that should participate in the processing. Each rib control unit (5100, 5101, ..., 5115) on the main packet distribution bus 5617 receives packet information and associated command information. Each rib control unit then passes that packet and command information to the appropriate nanocomputers located on the rib control unit's associated rib bus. Each selected nanocomputer then processes the packet information with the appropriate rules to generate results. All of the nanocomputer processing occurs in parallel such that an entire array of cells can concurrently process a single data packet.

Prioritization logic

When the results of an Array of Cells operation are to be reported, the operation results are reported back to the control unit 5410 using the inherent cell priority system. Specifically, each nanocomputer determines its highest priority cell result and reports to the local rib priority encoding logic in the local rib bus control unit. The local rib priority encoding logic selects the results from the highest priority report nanocomputer coupled the local rib bus and stores that result. Finally, an AoC priority encoding logic 5417 in the main control unit 410 will retrieve the result from the highest priority rib bus control unit that reports.

To achieve this result, each rib priority encoding logic (5200, 5201 . . . , 5215) in each rib bus control unit (5100, 5101 . . . , 5115) determines the highest priority match among its' nanocomputers and maintains this nanocomputer unit's value and stores it in a register. (5250, 5251, . . . , 5265). Some operations may output a resultant value. To store the most significant resultant value from the nanocomputers on the local rib bus, each rib priority encoding logic (5200, 5201, . . . , 5215) further includes a value register (5270, 5271, . . . , 5285). The AoC priority encoding logic 5417 in the main control unit 5410 will read the various value registers (5270, 5271, . . . , 5285) to select the highest priority value.

The Nanocomputer (or AS-Block)

Each nanocomputer comprises a simple complete computer system. Specifically, each nanocomputer contains all the basic elements of a computer system including input & output circuitry, a memory unit (often a SRAM) for storing instructions (rules), several arithmetic logic units (ALUs), and a control circuit for reading and processing the instructions. Since the main features in one nanocomputer embodiment are the ALUs and SRAM (for storing rules), the nanocomputer is also known as an ALU-SRAM block or AS-block.

The Nanocomputer (or AS Block) Architecture

Figure 6:
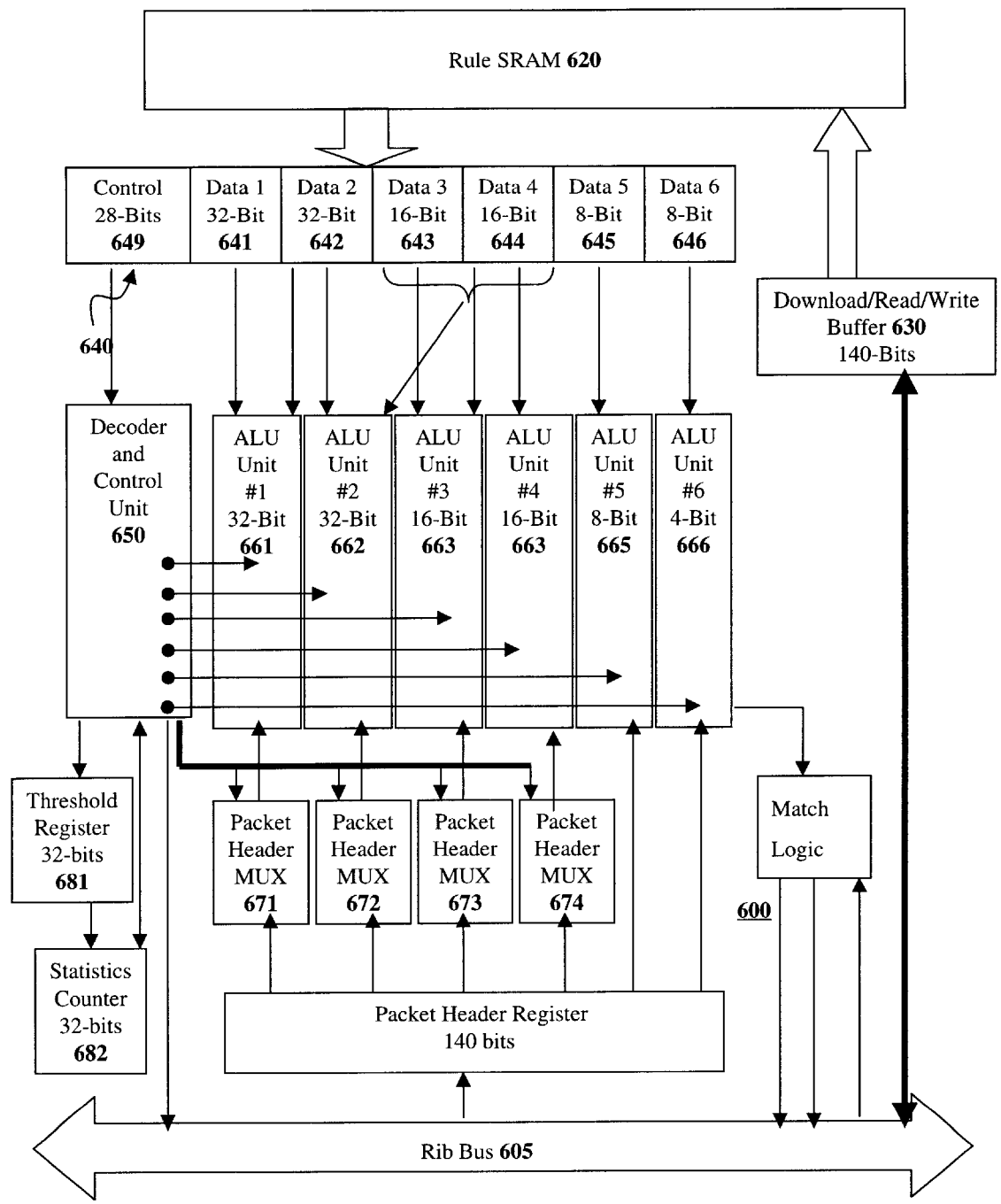
FIG. 6 illustrates one possible embodiment of an individual nanocomputer.

FIG. 6 illustrates a detailed block diagram of one possible embodiment of a nanocomputer 600. Referring to FIG. 6, the nanocomputer receives input information and sends output information through a bus 605. The bus 605 is the rib bus to which the nanocomputer is coupled. The information received from the bus 605 may be passed to a download/read/write register 630. The download/read/write register 630 may temporarily store downloaded rule information before such information is stored into the random access memory (RAM) unit 620.

The random access memory (RAM) unit 620 stores the instruction and data information (rules) that will be processed. As previously stated, in one embodiment the random access memory (RAM) unit 620 contains thirty-two entries for storing rules. In the embodiment of FIG. 4, each rule entry is one hundred and forty bits wide. However, nanocomputers can be constructed using different rule sizes. In one embodiment, the random access memory (RAM) unit 620 is constructed using static random access memory (SRAM) technology.

The rules in the random access memory (RAM) unit 620 are latched into a rule register 640. In the embodiment of FIG. 6, the rule register 640 passes a twenty-eight bit instruction word to a decoder and control unit 650 from the twenty-eight bit control portion 649. The remaining one hundred and twelve bits are split into six data fields 641, 642, 643, 644, 645, and 641. The data fields store the data information that is passed to the six different arithmetic and logic units (ALUs) 661 to 666. Again, it must be noted that the rule format disclosed in FIG. 6 and following figures represents only one possible rule format.

The nanocomputer's decoder and control unit 650 decodes the twenty-eight bit instruction and controls the operation of the six ALUs and the multiplexors that provide data to the ALU. The decoded instruction determines how the arithmetic logic units will process the data. Details on the format of the twenty-eight bit instructions will be disclosed in a later section.

The six different arithmetic and logic units (ALUs) 661 to 666 in the embodiment of FIG. 6 operate on the one hundred and twelve bits of data information from the rule retrieved from the rule RAM 620 and information retrieved off the bus 605. Under control of the decoder and control unit 650, the six arithmetic and logic units (ALUs) 661 to 666 perform comparison and arithmetic operations to produce a result.

In the embodiment of FIG. 6, the first two ALUs 661 and 662 operate on thirty-two bit data units. In the normal Internet packet filtering application, the first two ALUs 661 and 662 operate on the source and destination Internet Protocol (IP) addresses retrieved from IP packet headers off the bus 605. However, these first two ALUs 661 and 662 may operate on other packet data fields or other data types in other applications. In such other applications, the proper data must be supplied to the packet inspector engine such that data appears on bus 605. Associated multiplexors 671 and 672 are then used to direct the proper data field from the bus 605 into ALUs 661 and 662.

In most operations, ALU 661 operates only on reference data from the data field 641 and packet data retrieved from the bus 605. However, in certain operations, such as masked operations, require three input values. For masked operations, the ALU 661 operates on reference data from the data field 641, packet data from the bus 605, and mask data from the adjacent data field 642. Similarly, ALU 662 normally operates on reference data from data field 642 and packet data from the bus 605, however ALU 662 may also incorporate a thirty-two bit value from data fields 643 and 644.

The next two ALUs 663 and 664 in the embodiment of FIG. 6 are sixteen-bit wide ALUs. In many cases, ALUs 663 and 664 are used to process source and destination TCP ports retrieved from TCP packet headers. However, ALUs 663 and 664 may operate on other data fields such that associated multiplexors 673 and 674 are needed to direct the proper data field from the bus 605 into ALUs 663 and 664. Out of these two 16-bit ALUs, only ALU 663 requires mask information from data field 645. ALU 664 operates only on reference data from the data field 641 and packet data retrieved from the bus 605. There is no mask information provided to ALU 664.

The fifth ALU, ALU 665, is usually used to examine the protocol field in TCP packet headers. Since the fifth ALU always examines the same data field, no multiplexor is needed. Similarly, the final ALU, ALU 666, always examines the same four flag bits in packet headers. Specifically, ALU 666 examines the SYN, Ack, and Fin flag bits from packet headers. A direction flag (DIR) is supplied by the network port controller (NPC) or the Network Interface Control (NIC) which receives and transmits packets between its ports. The direction flag usually specifies an inbound or outbound direction for a packet. ALU 666 also examines four enable/disable bits for each of the four flag bits examined.

When the arithmetic logic units have completed their processing the operation output may be sent out on the bus 605. Alternatively, for rules that maintain a state, the output may be placed back into the RAM 620 through the writeback register 630.

The Rules Stored in the Nanocomputer (or AS Block)

As set forth in the previous section, the rule SRAM 620 in the nanocomputer 600 stores rule information. In one embodiment, the rule information is stored with a twenty-eight bit coded control word portion and a one hundred and eight bit data portion. The twenty-eight bit coded control word determines how the ALUs will interpret the one hundred and eight bit data portion of the rule entry.

The following table lists one possible subset of data field formats that may be used for packet classification operations such as IP Routing, Firewall packet filtering, and QoS Classification.

TABLE 1

| Data field 1 | Data field 2 | Data field 3 | Data field 4 | Data field 5 | Data field 6 |
|---|---|---|---|---|---|
| SIP[32] | DIP[32] | SP[16] | DP[16] | Protocol [8] | Flags/ enable[8] |
| SIP[32] | SPDP[32] | SPM[16] | DPM[16] | Protocol [8] | Flags/ enable[8] |
| DIP[32] | SPDP[32] | SPM[16] | DPM[16] | Protocol [8] | Flags/ enable[8] |
| SIP[32] | DIP[32] | SP[16] | SPM[16] | Protocol [8] | Flags/ enable[8] |
| SIP[32] | DIP[32] | DP[16] | DPM[16] | Protocol [8] | Flags/ enable[8] |
| SIP[32] | SIPM[32] | SP[16] | DP[16] | Protocol [8] | Flags/ enable[8] |
| DIP[32] | DIPM[32] | SP[16] | DP[16] | Protocol [8] | Flags/ enable[8] |
| SIP[32] | SIPM[32] | SP[16] | SPM[16] | Protocol [8] | Flags/ enable[8] |
| SIP[32] | SIPM[32] | DP[16] | DPM[16] | Protocol [8] | Flags/ enable[8] |
| DIP[32] | DIPM[32] | SP[16] | SPM[16] | Protocol [8] | Flags/ enable[8] |
| DIP[32] | DIPM[32] | DP[16] | DPM[16] | Protocol [8] | Flags/ enable[8] |
| SIP[32] | DIP[32] | DIPM_lo[16] | DIPM_hi[16] | Protocol [8] | Flags/ enable[8] |
| SIP[32] | SIPM[32] | DIP_hi[16] | DIP_lo[16] | Protocol [8] | Flags/ enable[8] |

Wherein:
SIP = Source IP address
DIP = Destination IP address
DIP_hi = 16 high bits of a Destination IP address
DIP_lo = 16 low bits of a Destination IP address
SIPM = Source IP address Mask
DIPM = Destination IP address Mask
DIPM_lo = 16 low bits of a Destination IP Mask
DIPM_hi = 16 high bits of a Destination IP Mask
SP = Source TCP Port
DP = Destination TCP Port
SPDP = A concatenated Source TCP and Destination TCP port
SPM = Source TCP port Mask
DPM = Destination TCP Port mask
Protocol = The eight protocol bits in a TCP header
Flags/enable = The SYN, Ack, Fin and DIR flag bits and associated enable/disable bits The data field formats of Table 1 provide a good set of permutations of various packet header fields that are most often used for firewall packet filtering. However, the limited set of Table 1 is not exhaustive. Many other permutations exist and other packet header fields may be examined.

The compression of the rule representation leads to efficient memory conservation. An example of a real access control list is presented in Appendix-I The coded control word portion of a rule determines which of the data field formats in Table 1 will be used. The coded control word portion of a rule may be coded in a variety of different manners. FIGS. 7*a* through 7*h* illustrate one embodiment of encoding the control portion of a rule for packet filtering applications.

FIG. 7*a* illustrates the contents of all the twenty-eight bits in one possible encoding of the rule control word portion. Referring to FIG. 7*a*, the rule control word is divided into seven different sections. The first six sections specify how the six different ALUs in the nanocomputer will operate. The seventh section specifies a set of four control bits common to all rule control words. Each rule control word section will be described individually in FIGS. 7*b* to 7*h*.

Referring to FIG. 7*b*, the ALU #1 section for the first thirty-two bit ALU 661 has five control bits. The first three bits specify the operation that will be performed by the ALU. Specifically, the first three bits specify if the ALU 661 will perform an equal comparison, a greater-than comparison, a less-than comparison, force a "Match" for this ALU, force a "No Match" operation, Min operation or a Max operation. The fourth bit specifies if the first 32 bit ALU should use the thirty-two bit mask value in second data field when performing the specified operation. The fifth bit specifies how the multiplexor 671 for ALU 661 should be controlled. A "1" specifies the Source IP address from the bus 605 and a "0" specifies the destination IP address from bus 605.

Referring to FIG. 7*c*, the ALU #2 section for the first thirty-two bit ALU 662 has four control bits. Out of these four bits, two are used to specify the operation to be performed by ALU #2—an Equal compare, a Greater-Than compare, a Less-Than compare, or force a "Match" operation. The third bit specifies whether the mask information is to be used or not. The fourth bit specifies how the multiplexor 671 is controlled. A "1" specifies the destination IP (DIP) address from the bus 605 and a "0" specifies a concatenated source TCP port and destination TCP port from bus 605.

FIG. 7*d* describes the five control bits for the first sixteen-bit ALU, ALU 663. The first two bits specify the operation that will be performed by ALU 663 in the same manner as the thirty-two bit ALUs. Specifically, the first two bits specify if the ALU 663 will perform an equal comparison, a greater-than comparison, a less-than comparison, or force a "Match" operation. The next bit specifies if the mask value from the fourth data field should be used when performing the comparison. The final two bits specify how the multiplexor 673 routes information from the bus 605 into ALU 663. In one embodiment, the packet routing (multiplexor 673 control) bits specify if a source TCP port, a destination TCP port, or the upper sixteen bits of a destination IP address is routed into ALU 663.

FIG. 7*e* describes the five control bits for the second sixteen-bit ALU, ALU 664. The first two bits specify the arithmetic or logical operation that will be performed by ALU 663 in the same manner as the first four ALUs. The next two bits specify how the multiplexor 674 routes information from the bus 605 into ALU 664. In one embodiment, the packet routing (multiplexor 674 control) bits specify if a source TCP port, a destination TCP port, or the lower sixteen bits of a destination IP address is routed into ALU 664. The final control bit for ALU 664 specifies if the two sixteen-bit ALUs (ALU 663 and ALU 664) should merged together such that the two sixteen-bit ALUs act as one thirty-two bit ALU.

Referring to FIG. 7f, the fifth ALU, ALU 665, has only one control bit. That single control bit specifies if ALU 665 should be enabled. Similarly, FIG. 7g depicts that ALU 666 also only has a single control bit used to enable or disable ALU 666. However, it should be noted that data field 646 for ALU 666 also includes four enable/disable bits that will specify if the various flags examined by ALU 666 should be considered.

FIG. 7h specifies the common control bits for all control words. The first bit specifies if the rule is a composite rule. Composite rules are described in the following section. The second rule bit of the common control bits is the increment/decrement statistics counter. The increment/decrement bit specifies if the statistics counter should be incremented or decremented if the rule matches. The third bit specifies if the statistics counter or the threshold register is being used.

Statistics & Alarms

Referring back to FIG. 6, each nanocomputer includes a threshold register 681 and statistics counter 682. The statistics counter 682 is used to count the number of times a particular rule or set of rules, are satisfied. It is possible to either increment the statistics counter 682 up from zero and compare it with the threshold register 681 or load the statistics counter 682 with the value in the threshold register 681 and then decrement the statistics counter 682 down to zero.

The threshold register 681 and statistics counter 682 may be used for many different purposes. Two common uses for the threshold register 681 and statistics counter 682 are to: (1) provide packet classification and statistics collection; and (2) raise alarms when an attack on the network's security is suspected.

Packet classification and Statistics collection is performed by counting the number of packets received per "class". A class being defined by the firewall rules being activated by a match or "hit."

The threshold register 681 and statistics counter 682 may be used to raise an alarm when an attack is suspected. An attack may be suspected when the Packet Inspector Engine senses a number of packets of a particular type or "class" that are received in a specified time period (a sampling window) exceeds a pre-configured Threshold value. In response to such attack scenarios, the Packet Inspector Engine can be used to assert an alarm signal.

The two applications for using the threshold register 681 and statistics counter 682 functionality present in the AoC are provided only as examples. Many other methods of using the threshold register 681 and statistics counter 682 functionality exist.

The Threshold Register and a Statistics counter in each nanocomputer are thirty-two bits wide. The Threshold Register is used to hold a threshold value, which is loaded into the Statistics counter periodically for all nanocomputers in the Array of Cells block. The period over which the Alarms conditions are evaluated is referred as the "sampling window" and is set by the user or rule manager. After the sampling window has elapsed, statistics counters in all nanocomputers reload the threshold value in a decrementing usage.

The statistics counters can be incremented up from zero or decremented from the threshold value loaded from the threshold register. There are common rule control bits present in the RAM rule entry to control the statistics counters. The "Enable Statistics" bit is used to enable the statistics counter for a particular RAM rule entry and the "Increment/Decrement" bit is used to select between the increment or decrement operations.

In a sampling window, statistics counters in the various nanocomputers are updated if a "Match" occurs and the corresponding statistics enabled bit is set. This incrementing or decrementing takes place over multiple cycles in a single sampling window. If, during a sampling window, any statistics counter underflows or overflows, then the corresponding Packet Inspector chip asserts an alarm signal.

Any alarm raised in a particular sampling window may or may not be addressed by the external packet processor (PP). The only function that the Packet Inspector Engine does is to inform the external packet processor (PP) of any such alarms detected and continue its operations.

Composite Rules

Although the firewall rule format described in FIG. 7a through FIG. 7h has been design to accommodate the majority of typical firewall rule condition parameters, there will be some more complex rules that cannot be expressed within the confines the single 28-bit control word and 112-bit data field of each rule cell. A rule may require a multiple comparisons on the same packet data fields such that the same data field would need to be distributed to more than just one arithmetic unit.

To handle more the more complex firewall rules, the Array of Cells engine has been designed such that firewall rules may be expanded. Composite rules allow for additional data field comparisons by combining the results of up to four (or less) rules and presenting the overall result in the same processing cycle, as any other single (non-composite) rule.

To handle more the more complex firewall or classification rules, the array of cells engine has been designed such that rules may be expanded by means of "composite rules". Composite rules allow for additional data field comparisons by combining the results of up to four (or less) rules and presenting the overall result in the same processing cycle, as any other single (non-composite) rule. A composite rule can be formulated over rules present in adjacent nanocomputers, belonging to the same rib and present in the same row of RAM cells.

Composite rules are used to perform complex comparisons on a limited number of data packet fields in a single cycle. These rules operate by linking together the processing capabilities of adjacent nanocomputer units. Referring back to FIG. 5, each nanocomputer is linked to the adjacent nanocomputer with a "next match" output signal being given to a "previous match" input signal. For example, next match signal 5900 of nanocomputer 5000 is connected to the previous match signal of nanocomputer 5001. The next match signal informs the adjacent nanocomputer if a rule match has been detected in the previous nanocomputer. Thus, in FIG. 5, if a match occurs in nanocomputer 5000 then the next match signal 5900 is asserted such that nanocomputer 5001 is notified when nanocomputer 5000 has a rule match.

To create a composite rule, a nanocomputer is informed that it should not assert its match signal going the rib bus control unit. Instead, the nanocomputer only asserts the next match signal when a match occurs. The last nanocomputer in a series of linked nanocomputer asserts its match signal if that nanocomputer detects a match and all the other nanocomputers in the linked series detect a match. The last nanocomputer in a composite rule always asserts its next match signal high for the next nanocomputer.

Figure 8:
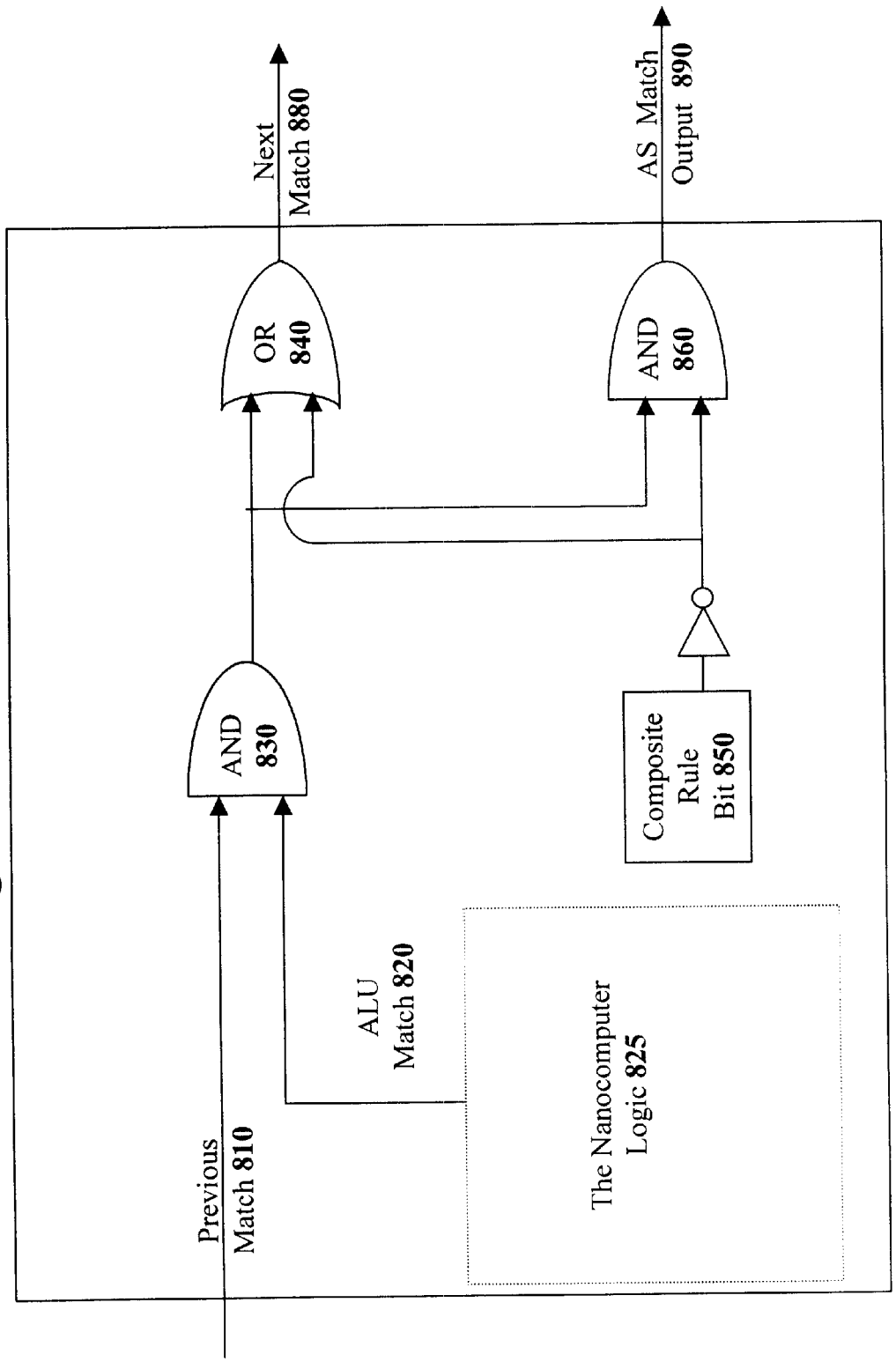
FIG. 8 illustrates one embodiment of circuitry that allows for composite rules using multiple nanocomputers.

FIG. 8 illustrates one possible logic embodiment for the composite rule logic that resides in each nanocomputer. Referring to FIG. 8, each nanocomputer unit includes a composite rule bit 850 that specifies if the nanocomputer is in the beginning or middle of a composite rule. When the composite rule feature is not being used, the composite rule bit 850 is clear in every nanocomputer. However, when the composite rule feature is being used, all of the nanocomputers in a composite rule have their composite rule bit set except for the last nanocomputer in the composite rule series. For example, in a four nanocomputer wide composite rule, the first three nanocomputers will have set their composite rule bits. Only the final (end) nanocomputer will have this bit clear. In addition, any other single rule that is not a part of a composite rule will have the composite rule bit clear. The composite rule bit determines how the next match 880 and AS_match 890 output signals will operate.

When the composite rule bit 850 is clear, the nanocomputer will output a AS_match signal on match output 890 that specifies if the nanocomputer detects a match (ALU_Match 820) AND the previous nanocomputer specifies a match (previous match 810). Furthermore, when the composite rule bit 850 is clear, the next match signal 880 will be always be asserted. Thus, by asserting the next match signal 880 at the end of each rule, the next nanocomputer's output will only depend on its own match determination. The table below explains the output of match signals based on the previous match signal as well as other relevant signals.

TABLE 2

| Input Signals | | | Outputs Signals | |
|---|---|---|---|---|
| Composite | Previous | | | |
| Bit 850 | Match 810 | ALU_Match 820 | AS_Match 890 | Next Match 880 |
| 1 | 0 | 0 | 0 | 0 |
| 1 | 0 | 1 | 0 | 0 |
| 1 | 1 | 0 | 0 | 0 |
| 1 | 1 | 1 | 0 | 1 |
| 0 | 0 | 0 | 0 | 1 |
| 0 | 0 | 1 | 0 | 1 |
| 0 | 1 | 0 | 0 | 1 |
| 0 | 1 | 1 | 1 | 1 |

Composite bit is reset for all single rules and the highest priority rule in a composite rule.

AS_Match is always low for rules in the beginning or middle of a composite rule set. For all other rules, it depends on the ALU_Match and the Previous Match signals.

AS Match=(Previous Match AND *ALU*_Match) AND (NOT Composite Rule Bit).

Next Match is always high for single rules and the highest priority rule in a composite rule set. For all other rules, this depends on the ALU_Match and the Previous Match signals.

Next Match=(NOT Composite) OR (Previous Match AND *ALU* Match)

When the composite rule bit 850 is set, the nanocomputer will not assert match signal on the match output signal 890. Instead, the nanocomputer will only send the logical ANDed combination of its own match determination 820 and the match determination from the previous nanocomputers in the composite series, previous match 810. Thus, when the composite rule bit 850 is set, only the next match signal is valid and its own match signal is low.

Quality of Service processing in the Array of Cells Engine

One task that must be performed by many network devices is providing quality of service scheduling. In a network device that provides quality of service scheduling, incoming packets are sorted based upon a defined priority system. The network device then places the sorted packets into different service queues that are used to provide varying quality of service levels. These service queues are sometimes known as quality of service (QoS) queues. A scheduler then services the different QoS queues at different intervals to provide each queue with an appropriate level of service.

Figure 9:
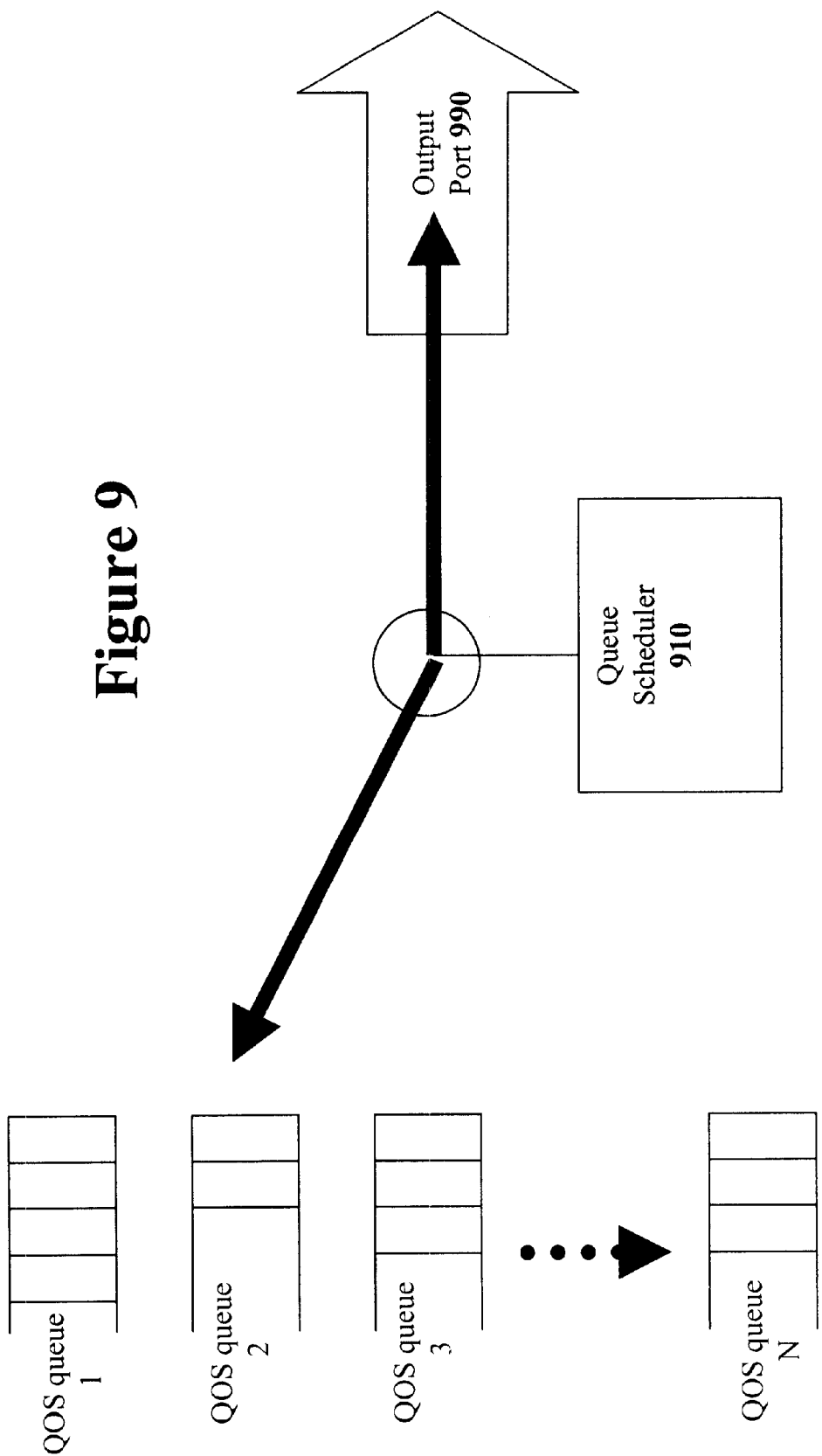
FIG. 9 illustrates a conceptual diagram of a QoS queue based packet scheduler.

FIG. 9 illustrates a conceptual diagram that describes the task that must be performed by a packet scheduler. In the illustration of FIG. 9, there are N QoS queues that contain data packets that need to be transmitted out of an output port 990. Each of the N QoS queues is assigned a certain amount of the outgoing port's bandwidth. When the scheduler 910 services a particular queue, the scheduler 910 fetches a data packet from the head of the QoS queue and transmits the data packet through the outgoing port 990. The scheduler 910 schedules each of the QoS queues at appropriate intervals such that all of the QoS queues are properly served. Specifically, the scheduler 910 accesses each QoS queue at a sufficient frequency such that each QoS queue receives its allocated bandwidth.

An Interval Based Packet Scheduler

To properly schedule each QoS queue, one common approach is to use an assigned service interval for each QoS queue. The service interval is an interval time that may pass between each time the particular QoS queue is serviced. The service interval is generally proportional to an inversion of the assigned bandwidth for that QoS queue. The deal service interval defines a maximum amount of time that may elapse between cells or a given queue being scheduled.

To implement an interval based packet scheduler, the scheduler 910 creates a next time to send (NTTS) variable $T(i)$ for each QoS queue i where I=1 to N. The NTTS variable $T(i)$ for each QoS queue specifies a relative time when the QoS queue should be serviced next. The scheduler 910 then assigns a service interval value $I(i)$ to each QoS queue. As previously set forth, the service interval value $I(i)$ is generally proportional to an inversion of the bandwidth assigned to that QoS queue.

The NTTS variable $T(i)$ for each QoS queue is first initialized with the assigned service interval $I(i)$ for that QoS queue. The scheduler 910 then begins servicing the queues by selecting a QoS queue j having the smallest service time TO). This queue j is serviced and the service time $T(j)$ is incremented using the QoS queue's assigned service interval $I(j)$. The scheduler then looks for the next QoS queue having the smallest NTTS variable $T(i)$ such that queue may be serviced and have its NTTS variable $T(i)$ updated.

Figure 10:
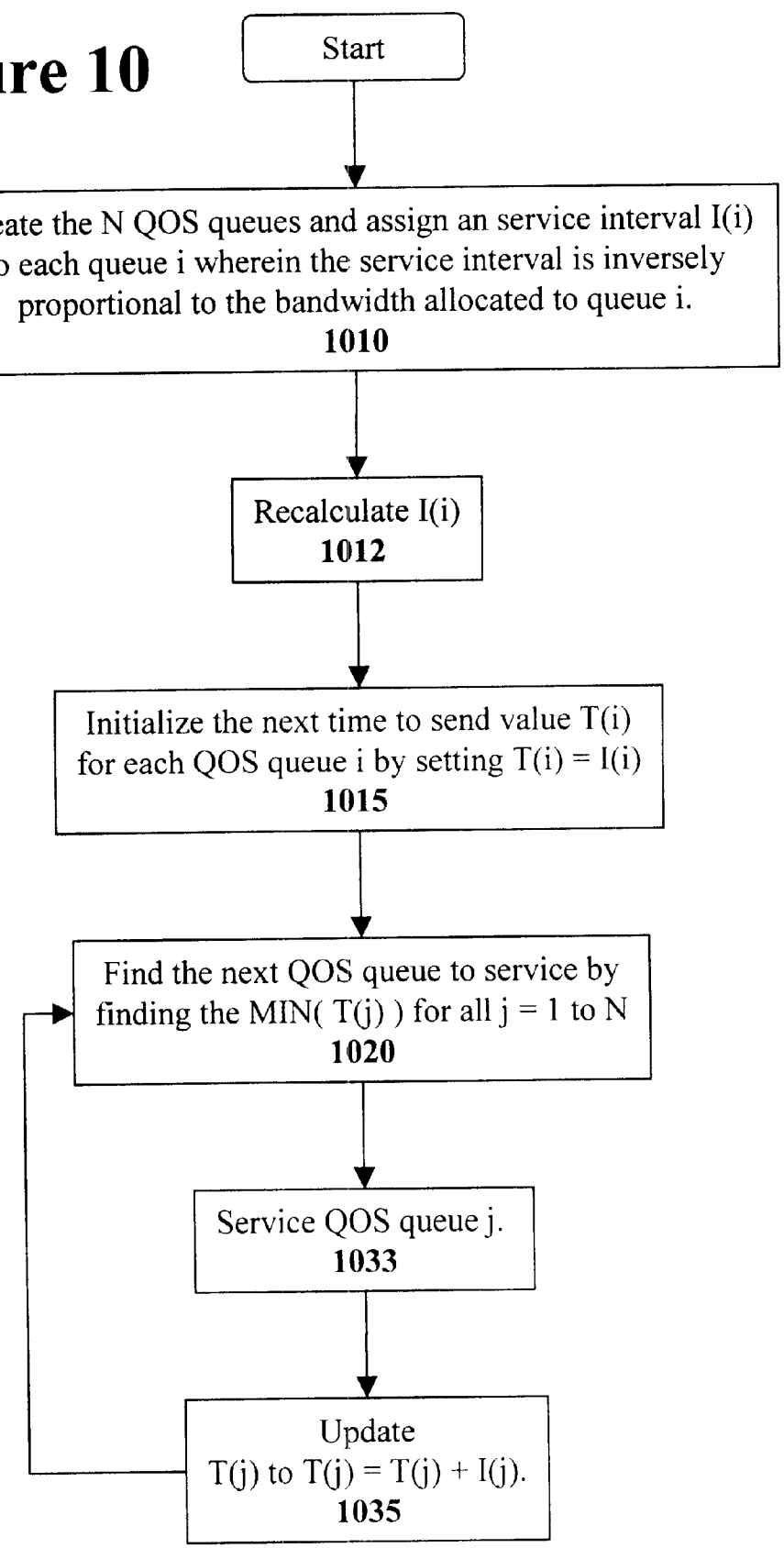
FIG. 10 illustrates a flow diagram describing the operation of an interval based packet scheduler.

FIG. 10 illustrates a generalized flow diagram of a service interval based packet scheduling method. At the first step 1010, a cell interval time $I(i)$ is assigned to each QoS queue that will be served. At step 1015, the queue scheduler is initialized. Specifically, at step 1015 a time reference variable TR is set to zero and a NTTS variable $T(i)$ for each QoS queue 1 through N is set to the QoS queue's interval time $I(j)$. After the initialization step 1015, the cell scheduling method is ready to begin servicing data packets from the QoS queues.

At step 1020, the scheduling method selects the first non empty QoS queue j, where the NTTS variable TO) is the smallest $T(k)$ where k=1 through N. After having selected a nonempty queue j with the smallest service time $T(j)$, then that queue j is serviced at step 1033. Next, at step 1035 the method updates the NTTS variable $T(j)$ for that queue j is determined. Specifically, the QoS queue's interval time $I(j)$ is added to its NTTS variable $T(j)$ to determine a next time to send. It should be noted that FIG. 10 provides a simplified version of one possible interval time based scheduling algorithm. Many variations of interval based scheduling variations exist. Furthermore, many other types of scheduling algorithms that require a minimum or maximum value from a set of values exist and would benefit from the teachings of the present invention. For example, adjustments must be made to handle NTTS variable overflows.

An Array of Cells with Min/Max functions

The interval based scheduling system described in the previous section is rather simple to implement. All of the operations are trivial integer based arithmetic and comparison functions. However, to implement an interval based scheduling system in a very high-speed network environment the operations of the interval based scheduling system must be performed exceedingly fast.

The most difficult aspect of interval based scheduling method disclosed in FIG. 10 is locating the QoS queue having the smallest NTTS variable $T(j)$ of all the QoS queues as specified in step 1020. In a network device that uses many different QoS queues, the network device would need to search through the list of QoS queues and compare all the NTTS variables $T(i)$ of all the QoS queues.

To aid in implementing an interval based scheduling system, one embodiment of the present invention provides a minimum/maximum (min/max) feature. Specifically, each nanocomputer includes min/max logic that allows the nanocomputer to quickly locate a minimum or maximum value stored within a subset of its memory. Each rib control unit also includes min/max logic such that the rib control unit can determine the minimum/maximum value of all the nanocomputers on its rib bus. Finally, the main control logic includes minimum/maximum logic that selects the minimum or maximum value from the various rib bus control units.

Figure 11:
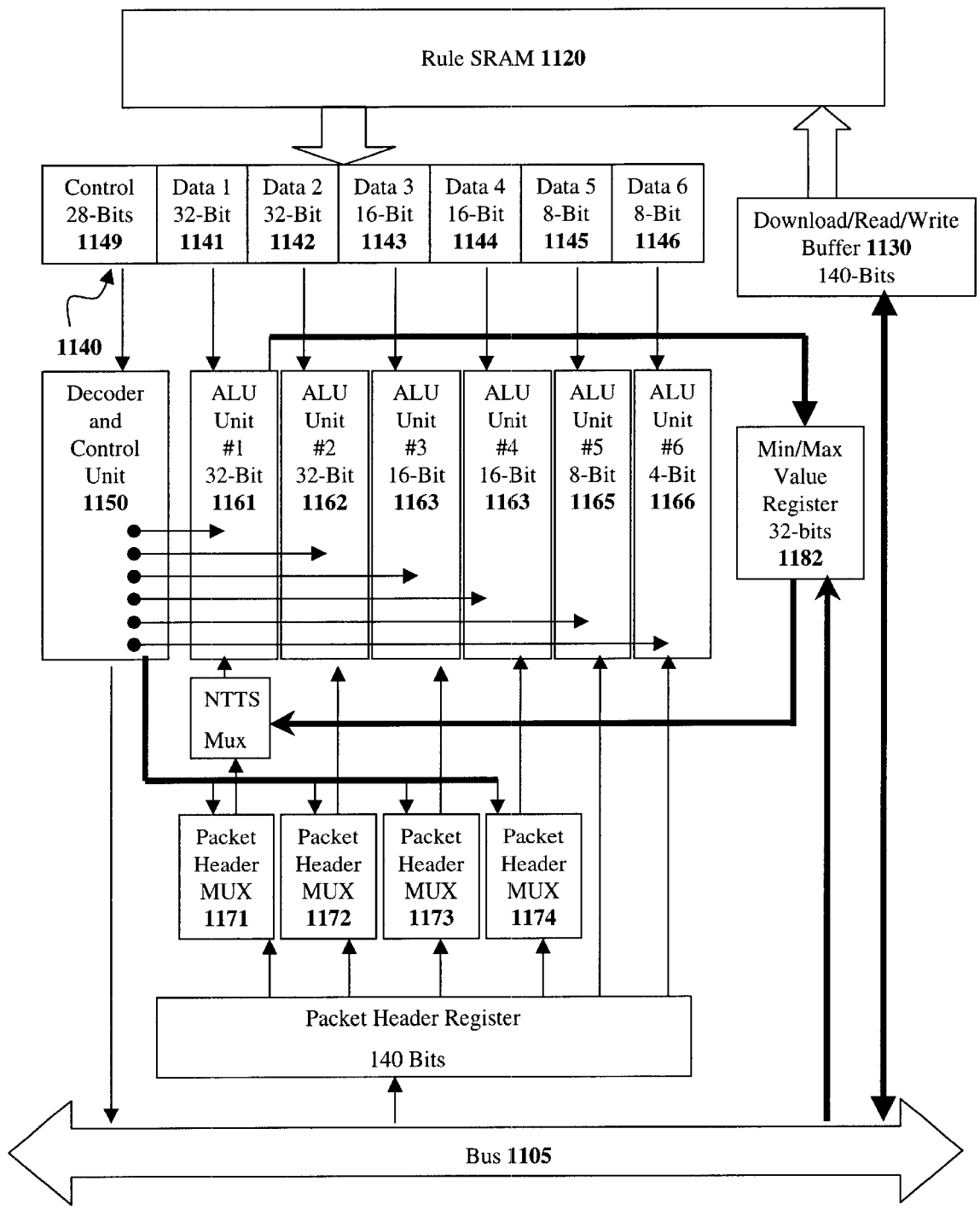
FIG. 11 illustrates one possible embodiment of an individual nanocomputer that provides a minimum/maximum function.

FIG. 11 illustrates one possible embodiment of a nanocomputer unit with a min/max value register 1182 for storing a current minimum/maximum value. When the nanocomputer of FIG. 11 is instructed, the nanocomputer reads a first RAM rule entry containing a value to be compared into the min/max value register 1182. Next, the nanocomputer loads a next RAM rule entry containing a value to be compared into register 1140. The nanocomputer then compares the value in the min/max value register 1182 against that value with a 32-bit ALUs 1161. If the value in the register 1140 exceeds the threshold comparison against the value in min/max value register 1182 (is less than a current minimum value or is greater than a current maximum value) then that value in register 1140 is loaded into the min/max value register 1182. The nanocomputer successively cycles all the rule RAM 1120 entries that contain values to be compared such that the min/max value register 1182 will contain the minimum or maximum entry in the RAM 1120. After completing the series of cycles that examine all the relevant entries in the RAM 1120, the nanocomputer will report the value in the min/max value register 1182 to its rib control unit when requested.

Referring back to FIG. 5, the rib priority unit in each rib control unit examines the min/max values from all the nanocomputers on its rib bus. The rib control unit will then place the minimum or maximum amount into a value register (5270, 5271,. , 5285) in the rib control unit. Finally, the control unit 5410 will examine all the value register (5270, 5271, . . . , 5285) in each rib priority unit and select the minimum or maximum value for the entire AoC array.

Using the min/max feature of the present invention, a packet inspector engine can quickly locate a minimum or maximum values stored within the RAM entries of the Array of Cells. In an application where 8192 queue values must be examined to locate a minimum value, a linear search system would require 8192 cycles. However, the present invention can perform such a search in approximately 64 cycles. Specifically, each nanocomputer uses 32 cycles to locate a local minimum from the 32 rule entries in the nanocomputer, then each rib bus control unit uses 16 cycles to determine a rib bus minimum value from the local minimum values in the 16 nanocomputers that report to the rib bus control unit, and finally the main control unit determines a global minimum value by examining the 16 rib bus minimum values in the 16 rib bus control units. A few extra cycles may be needed for reading and writing values.

Load Balancing using the Array of Cells Engine

Load Balancing can be implemented in the AoC compare engine by storing a load value representing the load on different servers in the rule entry cells. This load value may be expressed by different criteria based on the load balancing implementation. The Min/Max feature of the present invention can be used to quickly find the minimum rule entry containing the minimum load value. This minimum load value indicates the server having the lightest load.

In one embodiment, the load of a selected server is then updated to include the new load. For example, the load value can be incremented by a fixed number representing the number of packets sent to the server or the load value can be incremented by the packet count or byte count.

A more complex update of the server load value can be done based upon other specific characteristics of the connection as implied by the classification of the packet done by the AoC.

Network Address Translation Using the Array of Cells Engine

The Packet Inspector Engine and the array of cells compare engine of the present invention can be used to help perform network address translation in a simple manner. With the teachings of the present invention, a nanocomputer can "learn" about a new TCP connection when the new TCP connection is established. Specifically, a nanocomputer can store the source IP address, destination IP address, source TCP port, and destination TCP port for the new TCP connection into a rule entry. To later identify data packets that belong to that TCP connection, a network address translation area of the array of cells attempts to match an incoming packet to the known TCP connections. When a known TCP connection is located, the cell number is used to identify a record that stores information about that TCP connection.

The foregoing has described a method and apparatus for performing high-speed rule processing for packet classification. This capability may be used in a variety of network packet processing applications such as firewall packet filtering, IP routing, QoS classification, network address translation, etc. The method and apparatus of the present invention also describe a scheme to quickly calculate the minimum and maximum values among a set of values. This feature can be used in many applications including QoS scheduling, load-balancing, etc.

It is contemplated that changes and modifications may be made by one of ordinary skill in the art, to the materials and arrangements of elements of the present invention without departing from the scope of the invention.

We claim:

1. A method of quickly processing an incoming packet, said method comprising:

distributing information from said incoming packets from a main control unit to a plurality of nanocomputers, said nanocomputers organized into groups, each of said nanocomputers comprising a set of instructions;

concurrently processing said incoming packets within said nanocomputers using at least one instruction in said nanocomputers to generate an instruction outcome in each said nanocomputer;

determining a group prioritized result within each nanocomputer group;

determining a global prioritized result from said group prioritized result; and returning a prioritized final result to said main control unit, said prioritized final result comprising a highest priority instruction outcome from said plurality of nanocomputers.

2. The method as claimed in claim 1 further comprising:
   returning a prioritized final result to said main control unit, said prioritized final result comprising a highest priority instruction outcome from said plurality of nanocomputers.

3. The method as claimed in claim 1 wherein said groups of nanocomputers her comprise a group control unit.

4. The method as claimed in claim 3 wherein adjacent nanocomputers in a nanocomputers group may be linked such that instructions in adjacent nanocomputers may be treated as a single instruction.

5. The method as claimed in claim 3 wherein said group control unit determines said group prioritized result.

6. The method as claimed in claim 5 wherein said group control unit determines said group prioritized result by polling nanocomputers in said group of nanocomputers.

7. The method as claimed in claim 1 wherein each nanocomputer comprises an arithmetic logic unit.

8. The method as claimed in claim 1 wherein each nanocomputer comprises am memory.

* * * * *